May 17, 1960     M. R. LAWSON     2,936,484
LOADING DEVICE
Filed May 21, 1958                      4 Sheets-Sheet 1
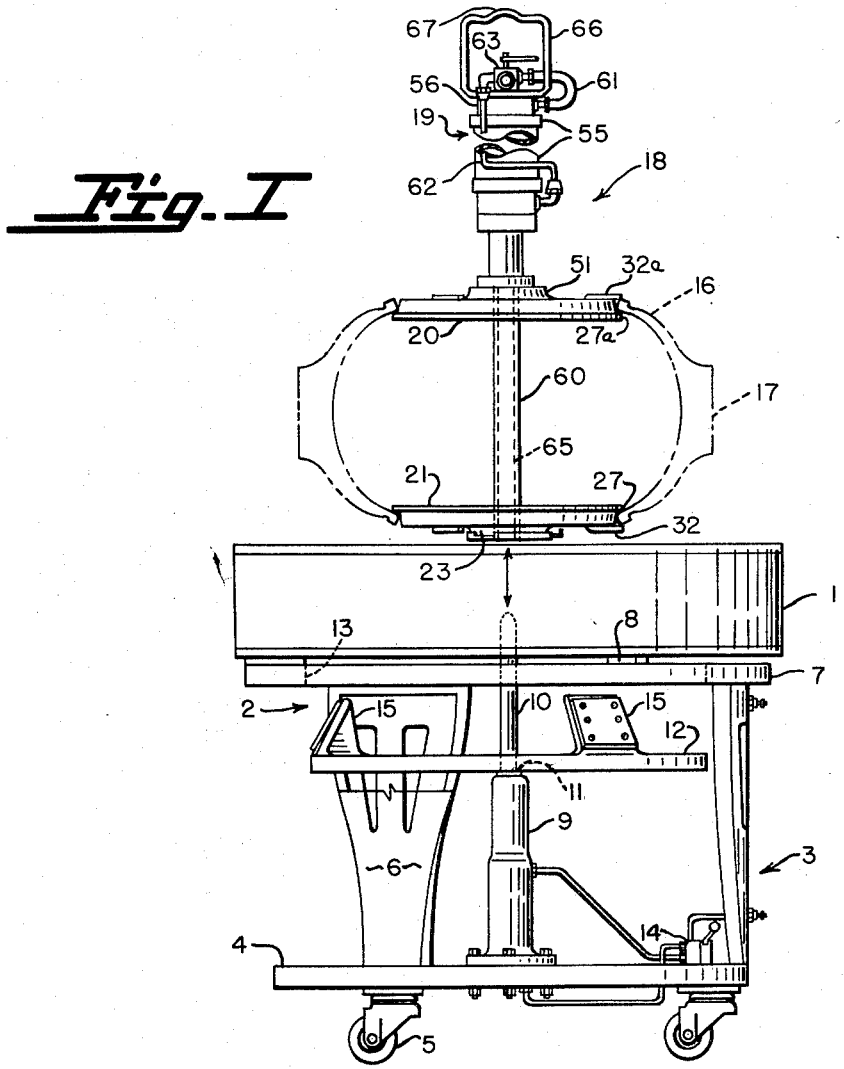
Fig. I
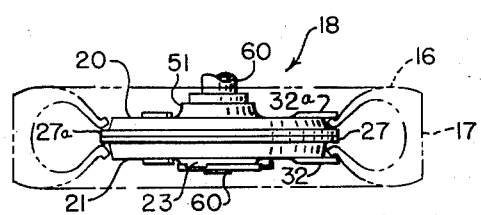
Fig. II
INVENTOR.
MELBOURNE R. LAWSON
BY
ATTORNEYS

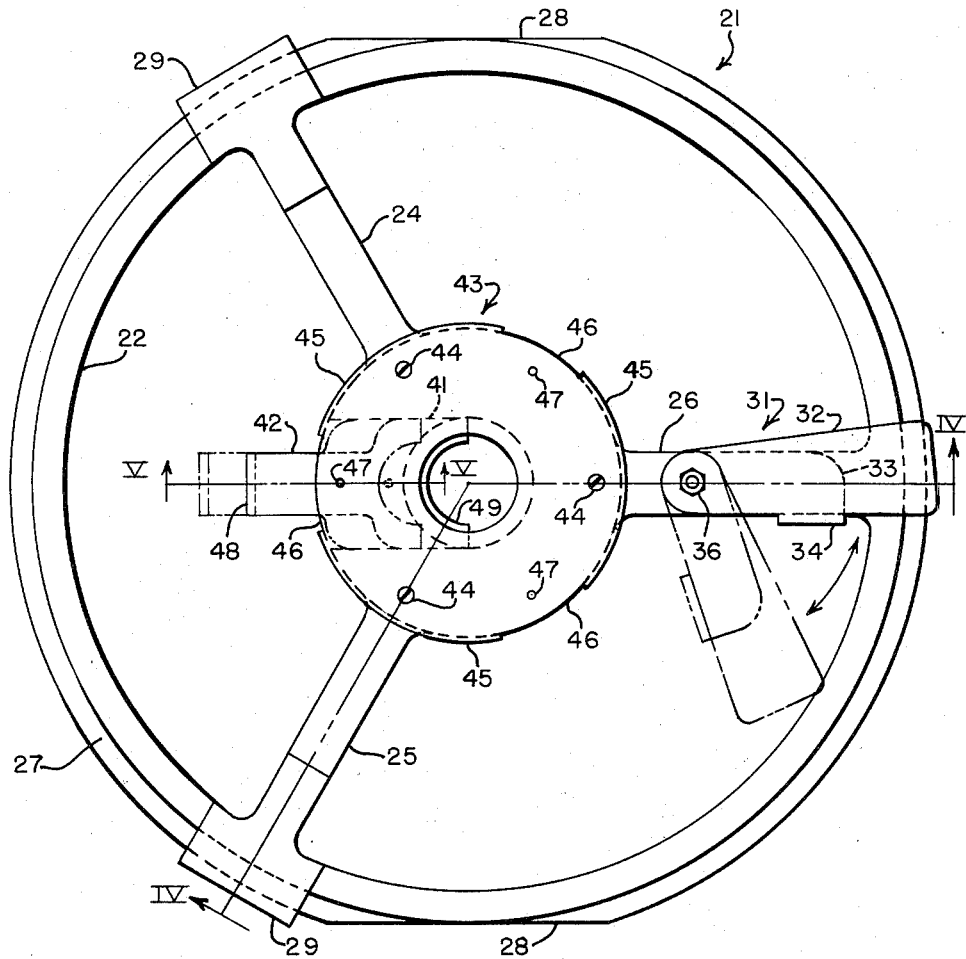
*Fig. III*
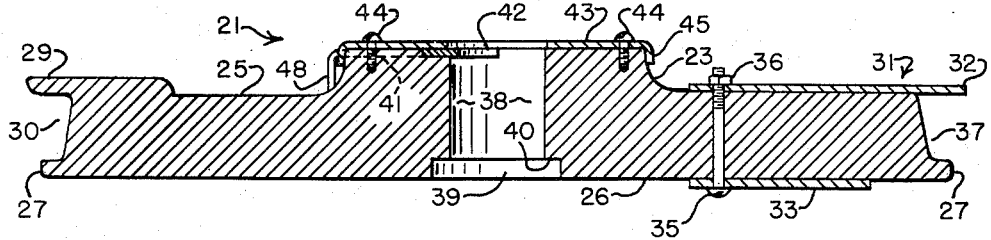
*Fig. IV*
INVENTOR.
MELBOURNE R. LAWSON

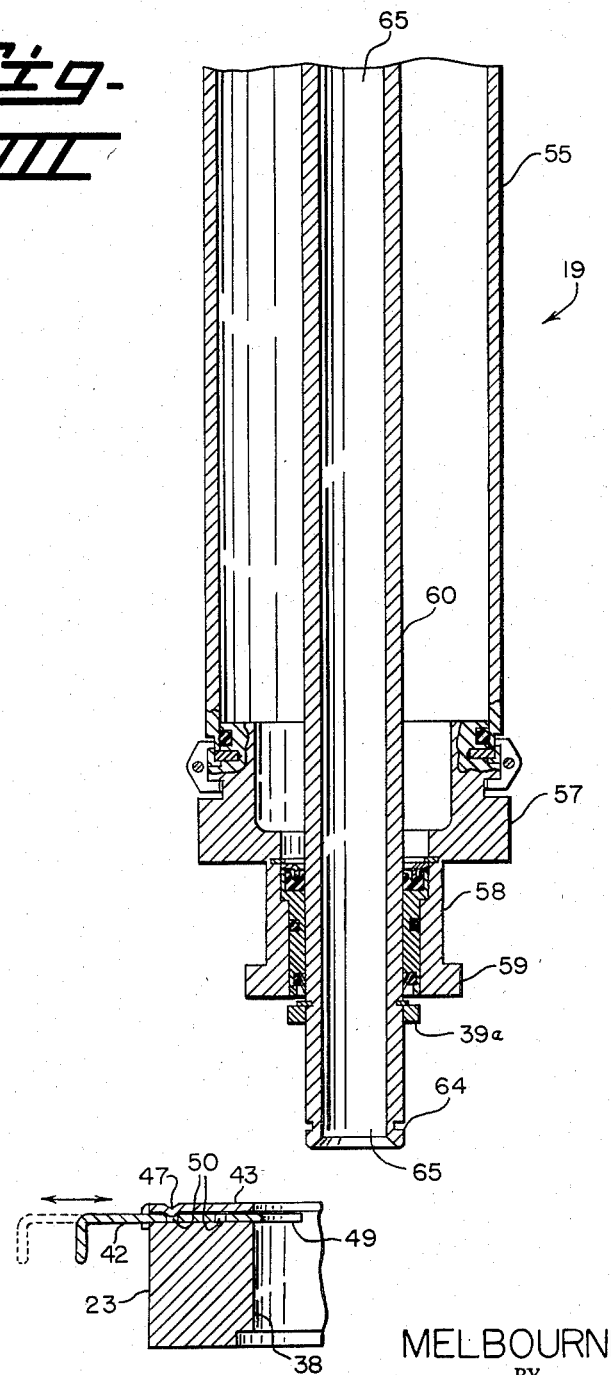

May 17, 1960 M. R. LAWSON 2,936,484
LOADING DEVICE
Filed May 21, 1958 4 Sheets-Sheet 4
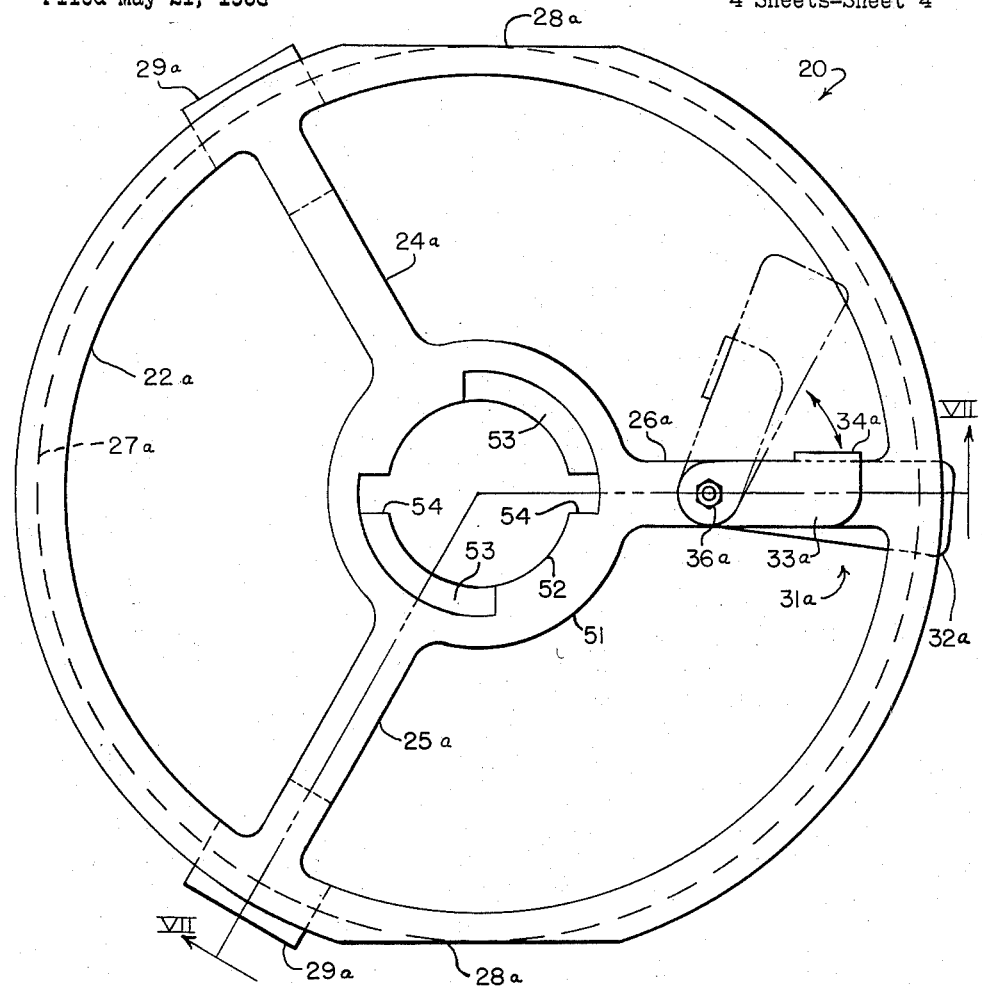
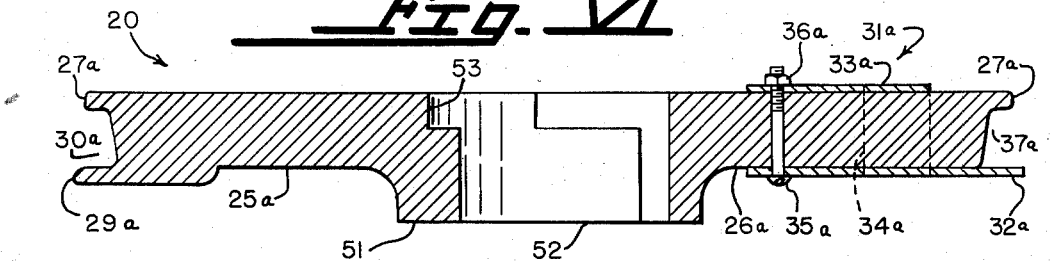
INVENTOR.
MELBOURNE R. LAWSON
BY
*Marshall, Marshall & Yeasting*
ATTORNEYS United States Patent Office 2,936,484
Patented May 17, 1960

2,936,484

LOADING DEVICE

Melbourne R. Lawson, Macon, Ga., assignor to Clement O. Dennis, Macon, Ga.

Application May 21, 1958, Serial No. 736,923

6 Claims. (Cl. 18—18)

This invention relates to recapping and retreading apparatus for tire casings and particularly to a device for loading a tire casing into a band mold matrix in a centered position.

Various types of band mold matrices are shown and described in U.S. application Serial No. 660,606 which was filed on May 21, 1957 and now abandoned but continued in part as U.S. application Serial No. 773,583 which was filed on November 13, 1958. One of the problems in the use of such mold matrices is the locating of the tire casings deep enough in the mold matrices so that the lid-like clamping mechanisms which hold the tire casings down in the mold matrices do not cause what is known in the trade as "roll over." Each of the mold matrices is of a size to fit some particular size of tire casing. If the sizes of such particular size of tire casings were uniform no problem of "roll over" would occur. However, the sizes of such tire casings are not uniform and, therefore, the oversize ones of the tire casings do not readily fit down into the molds. Heretofore, the upper side walls of such oversize tire casings have been forced or rolled down into the molds by the lid-like clamping mechanisms. This caused the newly applied treads to be offset from centered positions relative to the median diametrical planes of the tire casings and, hence, produced unbalanced recapped and retreaded tires which do not wear well.

The mold face of a band mold matrix is provided with ridges which mold the desired design in the camel back or tread strip, cemented about the periphery of a tire casing, during the curing operation. During the curing operation, the heated camel back or tread strip flows into the tread design in the mold face. Therefore, in addition to so locating the tire casing in the mold matrix that "roll over" is avoided, the tire casing should be concentrically located relative to the continuous annular mold face so that the tread rubber will be distributed uniformly in a balanced sense around the tire casing.

In addition to so locating the tire casing in the mold matrix that "roll over" is avoided and to locating the tire casing in a centered position relative to the mold face, the tire casing should be so positioned within the mold matrix that the median diametrical planes of the tire casing and of the mold matrix coincide. If such planes do not coincide, i.e., if the planes are tilted relative to each other, the newly applied tread weaves back and forth on the road and soon wears out.

It is, accordingly, the principal object of this invention to provide a device for so loading a tire casing into a mold matrix that the problem of "roll over" is eliminated.

Another object of the invention is to provide a device for loading a tire casing into a mold matrix having means for so positioning the tire casing that no "roll over" occurs in combination with means for centering the tire casing relative to the face of the mold and for so positioning the tire casing that its median diametrical plane coincides with the median diametrical plane of the mold matrix.

Other objects and advantages will be apparent from the following description in which reference is had to the accompanying drawings.

According to the invention, a loading device is provided which has means for drawing the beads on opposite sides of a tire casing apart in an axial direction to correspondingly reduce the tread diameter of the casing until it will pass within a mold matrix having the same internal diameter as the normal external diameter of the tire casing and, after the tire casing is within the mold, for forcing the beads together uniformly beyond their normal positions so that the tire casing does not obstruct the lid-like clamping mechanism when it is put in place. Hence, even though the tire casing is too large for the mold, its upper side wall is not rolled over by the clamping mechanism. Such means has a sleeve portion which guidingly receives a vertical post of a centering device that is centered within the mold matrix to center the tire casing relative to the face of the mold and to prevent the tire casing from tilting as it is lowered by the loading device into the mold matrix.

A preferred form of the loading device is illustrated in the accompanying drawings.

In the drawings:

Fig. I is an elevational view of the loading device in its extended position showing a tire casing in broken lines that has its beads drawn apart by the loading device to reduce the tread diameter of the casing and that is being lowered into a centered band mold matrix prior to a curing operation;

Fig. II is a fragmentary elevational view of the loading device in its retracted position;

Fig. III is an enlarged bottom plan view of the lower one of the rims or wheels of the loading device illustrated in Figs. I and II;

Fig. IV is a vertical sectional view taken along the line IV—IV of Fig. III;

Fig. V is an enlarged fragmentary vertical sectional view taken along the line V—V of Fig III;

Fig. VI is an enlarged bottom plan view of the upper one of the rims or wheels of the loading device illustrated in Figs. I and II;

Fig. VII is a vertical sectional view taken along the line VII—VII of Fig. VI; and Fig. VIII is an enlarged vertical sectional view of the lower end of the loading device illustrated in Fig. I with the rims or wheels removed to reveal details, the loading device being shown in its retracted position.

These specific figures and the accompanying description are intended merely to illustrate the invention and not to limit its scope.

Referring to Fig. I, a band mold matrix 1 is supported by a centering device 2 which is like the one shown and described in detail in copending U.S. application Serial No. 736,307 filed on May 19, 1958. The band mold matrix is not shown in detail because it is not part of the invention. Various types of band mold matrices are shown and described in detail in the hereinbefore referred to U.S. applications Serial Nos. 660,606 and 773,583. Generally, such matrices are in the form of an unbroken annulus which includes an inner body with a substantially vertical tread-forming mold face, a first side skirt having a face contoured to form a first side wall of the mold and a second lid-like side skirt in the form of a ring that is freely removable and that has a face contoured to form a second side wall of the mold. The face of the mold is provided with ridges which when heated mold the desired design in the camel back or tread strip, applied about the periphery of the tire casing, during the curing operation.

The first side skirt of the band mold matrix 1 is contacted by the centering device 2 to center the matrix on the centering device prior to the loading operation. The centering device 2 includes a loading stand 3 having a circular base 4 to which are secured three casters 5 that are located 120 degrees apart. The base 4 supports three vertical legs 6 surmounted by a round horizontal plate 7 having three contact pads 8 formed thereon which also are spaced 120 degrees apart. The loading stand 3, thus, is in the nature of a wheeled table, the upper horizontal surface of the plate 7 functioning as the top of the table.

The base 4 also supports an ordinary air cylinder 9 having a piston therein to which one end of a piston or guide rod 10 is connected, the axis of the piston rod being perpendicular to the plate 7. A shoulder 11 on the piston rod 10 supports a circular plate 12 having a diameter somewhat less than the diameter of a large circular opening 13 in the plate 7, the plate 7, thus, being shaped like a ring which, when the plate 12 is at the same elevation as the plate 7, closely surrounds but does not touch the plate 12. The plates 7 and 12 and the piston rod 10 have a common center.

The piston rod 10 and the plate 12 carried thereby are moved, when air is admitted to the cylinder 9 by opening a valve 14, from a bottom position shown in Fig. I through the plate or ring 7 to an upper position wherein the plate 12 is slightly higher than the plate or ring 7. In such upper position, the upper surface of the plate 12 is at about the same height as the upper surfaces of the contact pads 8 on the plate or ring 7. In such position, angle pads 15 carried by the plate 12 are at an elevation above the contact pads 8 on the ring 7. There are three of the angle pads 15 spaced 120 degrees apart about the periphery of the plate 12. Each of the angle pads has a slanting face which slants at an angle of about 30 degrees from the vertical toward the piston rod 10.

In the operation of the centering device 2, the band mold matrix 1 is placed upon the contact pads 8 of the plate or ring 7 in a position roughly centered relative to the axis of the piston rod 10, the piston rod 10 and the plate 12 carried thereby being in the bottom position. The cylinder 9 is operated to lift the angle pads 15 through the ring 7 to their upper positions. The slanting faces of the angle pads on the way up contact the lower inside circular edge of the annular band mold matrix 1 and automatically shift or cam it to a position on the contact pads 8 that is accurately centered relative to the axis of the piston rod 10 which is the reference axis of the centering device. The piston rod 10 and the plate 12 then are returned to the bottom position, i.e., the position shown in Fig. I, and a tire casing 16 having a camel back or tread strip 17 cemented about its periphery is lowered by means of the loading device 18 of the invention into the centered mold matrix 1.

The mold face of the band mold matrix 1 is of an internal diameter substantially equal to the normal external diameter of the tire casing before the casing has become worn or after the camel back or tread strip has been applied to it. Accordingly, in order to insert the tire casing with the camel back or tread strip thereon in the annular mold matrix, it is necessary to substantially reduce the tread or external diameter of the casing until it will pass through the circular opening of the annular mold matrix. This operation also is necessary in order to facilitate the removal of the casing from the mold matrix following the curing operation.

In order to reduce the external or tread diameter of the tire casing, the loading device 18 is used advantageously to force the beads of the tire casing apart in an axial direction correspondingly reducing the tread diameter of the casing until it will pass freely within the circular opening of the mold matrix 1. This is the condition of the tire casing 16 as illustrated in Fig. I. After the tire casing 16 is loaded into the mold matrix 1, the loading device 18 is used advantageously to force the beads together uniformly beyond their normal positions so that the upper side wall of the tire casing, if the casing happens to be slightly oversize, does not obstruct the lid-like skirt or ring of the mold matrix when it is clamped in place. This is the condition of the tire casing 16 as illustrated in Fig. II.

The loading device 18 includes a pneumatic cylinder assembly 19, an upper bead spreading and contracting wheel 20, and a lower bead spreading and contracting wheel 21, the wheels 20 and 21 forming a split rim which engages the beads of the tire casing 16 during the bead spreading operation as shown in Fig. I and during the bead contracting operation as shown in Fig. II.

The lower bead spreading and contracting wheel 21 is shown in detail in Figs. III–V; it comprises a ring 22 which is connected to a hub 23 by means of three circularly spaced radial spokes 24, 25 and 26. The ring 22 is formed with an integral peripheral flange 27 which as shown in Fig. I fits inside the casing 16 and is adapted to engage the proximal surface of the lower bead of the casing during the bead spreading operation. Flats 28 on the ring 22 facilitate inserting the wheel 21 in the casing, the flange 27 being inserted in the casing surrounded by the bead by tilting the wheel and forcing the flange through the opening in a substantially diametrical plane.

Spokes 24 and 25 are identical and each has an integral peripheral flange 29 which is so spaced from the flange 27 on the ring 22 that the bead of the tire casing fits snugly and is gripped within such space which is broadly designated at 30 in Fig. IV. Spoke 26 has a pivotable flange assembly 31 which is formed by bending from a flat strip of metal to have a flange member 32 on the bottom of the spoke 26 and a hold down member 33 on the top of the spoke 26 which functions to strengthen the assembly by preventing the flange 32 from being bent back, the members 32 and 33 being interconected by a vertical strip 34. The flange assembly 31 is pivotally mounted on the spoke 26 by means of a bolt 35 and a nut 36 and is pivoted from a bead locking position shown in solid lines in Fig. III to an unlocked position shown in broken lines in Fig. III. When in bead locking position, the flange 32 together with the flange 27 on the ring 22 defines a peripheral space which is broadly designated at 37 in Fig. IV. Before the wheel 21 is inserted within the casing, the flange assembly 31 is pivoted into its unlocked position. The flange 27 then is inserted in the casing as hereinbefore described, the lower bead of the casing forced between the flanges 27 and 29 at the spokes 24 and 25, and the flange assembly 31 pivoted to its bead locking position to catch the bead between the flanges 27 and 32 at the spoke 26. This secures the lower bead to the wheel 21 so that it moves with the wheel as one into its spread apart position (Fig. I) or into its contracted position (Fig. II).

The hub 23 of the lower wheel 21 projects below the spokes and has a circular bore 38 therein, the bore being counterbored to form a cavity 39 having a shoulder 40. A shallow horizontal groove 41 is formed in such lower projecting part of the hub 23 and slidable therein is a lock 42 that is held in the groove by means of an apertured cap 43 which is held in turn by means of three screws 44 on the hub, the aperture in the cap and the bore 38 being concentric and having about the same radii.

The cap 43 has a turned up edge 45 which is separated into three equal equally spaced sections by spaces 46. On the radial centerline of each of the spaces 46 is located a detent dimple 47 formed in the cap 43 at positions 120 degrees apart. The lock 42, which has a handle 48, a U-shaped end 49 and two holes 50 (Fig. V) spaced along its centerline, is slidable in the groove 41 in one of the spaces 46 that separate the cap edge 45 into three sections. Depressions (not shown) in the hub 23 act as relief for the detent dimples 47 in the cap so that the dimples do not space the cap from the hub.

The lock 42 is slidable under finger pressure between two positions determined by engagement of a detent dimple 47 with one or the other of the holes 50 in the lock, the space 46 within which the lock slides being too narrow for the lock to be withdrawn from the groove 41 in the hub. The locked position of the lock 42 is shown in solid lines in Fig. V with the detent dimple 47 in the left hand one of the holes 50, the dimple retaining the lock in the selected position. In this position the U-shaped end 49 of the lock is positioned within the bore 38 in the hub to catch a part of the pneumatic cylinder assembly 19 as hereinafter described. The unlocked position of the lock is indicated in broken lines in Fig. V. The locked position also is shown in solid lines and the unlocked position in broken lines in Fig. III. Only one of the three detent dimples 47 functions at a time, two being held in reserve. Should a dimple wear down, the three screws 44 are removed, the cap is turned to locate another dimple on the centerline of the lock 42 in line with the holes 50 in the lock and the cap is again secured to the bore by means of screws 44.

The upper bead spreading and contracting wheel 20 is shown in detail in Figs. VI and VII, it, except for its hub 51, is similar to the wheel 21 hereinbefore described. Reference numerals in Figs. VI and VII which are similar to those in Figs. III–V identify like parts.

The hub 51 of the upper wheel 20 projects above the spokes 24a, 25a and 26a and has a circular cavity or bore 52 therein. The lower portion of the hub has substantially quarter-circular cavities therein to form a bayonet slot 53 and in alignment with the walls of the hub there are provided diametrically opposed key slots 54 in the upper portion thereof.

The pneumatic cylinder assembly 19 includes a tube 55 which has a cylinder head 56 suitably secured to the upper end thereof and a cylinder base 57 (Fig. VIII) suitably secured to the lower end thereof. The cylinder base 57 has an axially aligned circular projection 58 on its lower end which is provided with a pair of outwardly projecting lugs or keys 59 disposed in diametrically opposed relationship to each other.

The projection 58 on the cylinder base 57 is adapted to slidably fit in the bore 52 in the hub 51 of the upper wheel 20. The keys 59 are of such size that they may be slidably inserted in the corresponding key slots 54 in the hub 51 whereupon the cylinder assembly 19 may be rotated a quarter revolution to lock the keys 59 in the bayonet slot 53. This secures the upper wheel 20 to the cylinder base 57 so that it moves as one therewith.

The pneumatic cylinder assembly 19 also includes a piston rod 60 (Figs. I, II and VIII) mounted for sliding or free axial movement in the projection 58 on the cylinder base 57 and has an ordinary piston (not shown) fixed to the upper end thereof. Air is admitted to the upper end of the cylinder tube 55, which is of the double acting type, through a line 61 and to the lower end of the cylinder tube 55 through a line 62 to extend and retract, respectively, the piston rod 60. Valve 63 controls the flow of air to the lines. The pneumatic cylinder assembly 19 in so far as it has been described is conventional. The extended position of the piston rod 60 is illustrated in Fig. I and its retracted position is illustrated in Figs. II and VIII. The piston rod 60 is provided with a circumferential groove 64 (Fig. VIII) at its lower end and an axially extending opening 65 (Figs. I and VIII) so that the rod is hollow in the nature of a sleeve, the opening 65 having a diameter such that the sleeve-like rod 60 can receive the piston rod 10 of the centering device 2 in a close sliding fit. In order to facilitate carrying the loading device 18 with the tire casing 16, the upper end of the cylinder assembly is provided with a bail handle 66 having a centrally disposed bend 67 for the reception of the hook of a suitable hoist or the like for raising and lowering the loading device and the tire casing in a loading station.

In operation, the band mold matrix 1 is accurately located on the loading stand 3 in a centered position relative to the axis of the piston rod 10 of the centering device 2 as hereinbefore described. An inflatable tube (not shown) is inserted in the tire casing 16 in collapsed condition, after which an ordinary curing rim (not shown) is inserted. Such a tube and rim are shown and described in the hereinbefore referred to U.S. applications Serial Nos. 660,606 and 773,583. Then, the lower wheel 21 is inserted in the casing with the lower bead of the casing between the flanges 27 and 29 at the spokes 24 and 25 and between the flanges 27 and 32 at the spoke 26 to secure the lower bead to the wheel 21 so that it moves with the wheel as one as hereinbefore described. Then, the upper wheel 20 is inserted similarly in the casing with the upper bead of the casing between the flanges 27a and 29a at the spokes 24a and 25a and between the flanges 27a and 32a at the spoke 26a to secure the upper bead to the wheel 20 so that it moves with the wheel as one. The hubs 23 and 51 of the wheels are oriented as illustrated in Figs. I and II.

The keys 59 on the cylinder base 57 of the cylinder assembly 19 are inserted in the key slots 54 of the upper wheel 20. The operator gives the cylinder assembly 19 a quarter turn to lock the lower end of the cylinder assembly 19 in engagement with the bayonet slot 53 in the hub 51 of the upper wheel 20. The counterbored cavity 39 (Fig. IV) in the hub 23 of the lower wheel 21 receives a ring 39a secured to the lower end of the piston rod 60, the ring 39a bearing on the shoulder 40 of the cavity 39, and the operator, by finger pressure on the handle 48 of the lock 42, pushes the lock into its locked position. In such position, the U-shaped end 49 of the lock 42 is located within the bore 38 in the hub 23 and is received in the circumferential groove 64 on the lower end of the piston rod 60 to secure the piston rod to the lower wheel so that they move together as one.

After the wheels 20 and 21 are secured to the cylinder assembly 19, the piston rod 60 is extended in order to separate the wheels and, thus, the beads of the tire casing. As the beads separate, the diameter of the casing diminishes. A little practice teaches how much separation is required to reduce the diameter of the casing to the proper extend for insertion into the mold matrix 1. The loading device 18 with the tire casing in spread condition are lifted above the mold matrix by the hoist into the position which is illustrated in Fig. I.

The loading device 18 is lowered to insert the tire casing 16 in its spread condition into the mold matrix 1, the device being so guided that the opening 65 in the sleeve-like piston rod 60 guidingly receives the vertical piston rod 10 of the centering device 2. It is an easy matter to cause the piston rod 10 to be so received because the bail handle 66 of the loading device 18 is rockable on the hook of the hoist and the loading stand 3 is positionable by virtue of the casters 5. This locates the tire casing concentrically within the mold matrix 1, since the tire casing and the mold matrix are centered concentrically with respect to the common reference axis, i.e. the axis of the piston rod 10 of the centering device 2. The centering of the tire casing concentrically within the mold matrix insures that the newly applied tread will have a uniform thickness all around the casing. During the curing operation, the heated camel back or tread strip 17 flows into the tread design in the mold face of the matrix and if the tire casing is not concentrically located relative to the mold face more of the plastic tread rubber will be distributed at some points on the casing than at others.

While the beads of the tire casing are in spread condition in the mold matrix 1, the curing tube (not shown) is partially inflated and the piston rod 6 of the cylinder assembly 19 is returned to its retracted position drawing the wheels 20 and 21 together. This forces the beads of the casing together uniformly beyond their normal positions as illustrated in Fig. II preventing "roll over." The mold matrix 1 is of a size to fit a particular size of tire casing. The actual sizes of such tire casings are not uniform and, therefore, the oversize ones of the tire casings do not readily fit down into the mold matrix. Heretofore, the upper side walls of such oversize tire casings have been forced or rolled down into the mold matrix by the lid of the matrix. This causes the newly applied treads to be offset from centered positions relative to the median diametrical planes of the tire casings and, hence, produced unbalanced tires which do not wear well. While the beads of the tire casing 16 are forced together in the mold matrix 1 in non-obstructing position by the loading device of the invention as shown in Fig. II, the lid-like side skirt or ring of the mold matrix is clamped in place in the usual way. Since the beads and, hence, the side walls of the tire casing are forced together uniformly, the upper side wall of the casing, even if the casing happens to be oversize, does not obstruct the skirt ring. Thus, the upper side wall of the tire casing is not rolled over by the ring as it is clamped in place and the finished product has a new tread which is centered relative to the median diametrical plane of the casing.

The cylinder assembly 19 is then removed from the tire casing by unlatching the lock 42 and by turning the assembly a quarter revolution so that the keys 59 register with the key slots 54, whereupon the cylinder assembly 19 is removed from the wheels 20 and 21. The wheels are removed from the casing in substantially the reverse of the manner in which they were originally inserted and the curing tube inflated to operating pressure for the curing process, the beads of the tire casing then moving outwardly automatically to their normal positions.

Positioning the tire casing 16 in the mold matrix with the piston rod 10 of the centering device 2 guidingly received in the opening 65 of the piston rod 60 of the loading device 18 prevents the casing being tilted horizontally relative to the mold matrix during loading, because the mold matrix is supported upon the contact pads 8 the upper surfaces of which are in a plane that is perpendicular to the axis of the piston rod 10 of the centering device 2. This locates the tire casing so that, when the loading device 18 is removed from the tire casing, and the curing tube inflated the tire casing will assume a position such that the median diametrical planes of the tire casing and of the mold matrix coincide. If such planes do not coincide, i.e., if the planes are tilted relative to each other, the new tread forms a helix on the casing and if followed going down a road is seen to weave back and forth. The close fit of the piston rod of the centering device 2 within the sleeve-like piston rod 60 insures that the tire casing is guided accurately into its concentric position relative to the mold face of the matrix and accurately into its aligned position relative to the median diametrical plane of the mold matrix.

The loaded mold matrix is removed from the loading stand 3, which easily can be rolled to a convenient unloading station, for the curing cycle and another mold matrix placed upon the loading stand to be centered and then loaded.

To remove the tire casing from the mold matrix, the curing tube is deflated, the cover ring of the mold matrix is removed, the loading device 18 is inserted in the casing as hereinbefore described, and the beads of the casing are again spread apart. When the diameter of the casing is reduced to the point at which the tread of the casing disengages from the tread ridges of the mold, the cylinder assembly 19 with the wheels 20 and 21 with the tire casing are lifted out of the mold matrix.

The embodiment of the invention described in connection with the drawings is to be regarded as illustrative only since the invention is susceptible to variation, modification and change within the spirit and scope of the appended claims.

Having described the invention, I claim:

1. Tire retreading or recapping apparatus comprising, in combination, a full circle mold matrix, a guide rod so located that it is centered relative to the mold matrix and perpendicular to the median diametrical plane of the mold matrix, and a device for loading a tire casing having beads each with first and second side portions into the mold matrix including a pair of bead spreading and contracting wheels, gripping means on each of the wheels adapted to contact said first side portions of the beads, spaced gripping means on each of the wheels adapted to contact said second side portions of the beads, at least one of the spaced gripping means on each of the wheels being movable selectively from gripping positions wherein they contact the beads to releasing positions wherein they are out of contact with the beads, and means, including a sleeve, for forcing the wheels apart to thereby spread the beads of the casing to reduce the tread diameter of the casing until it will pass within the mold matrix and, after the tire casing is within the mold matrix, for forcing the wheels together to thereby contract the beads of the casing beyond their normal positions to insure that, during the curing cycle, the tire casing will be centered relative to the median diametrical plane of the mold matrix, the sleeve receiving the rod to guide the tire casing into a concentric position in the mold matrix such that the median diametrical planes of the tire casing and of the mold matrix coincide.

2. Tire retreading or recapping apparatus according to claim 1 wherein each of the wheels has an axial opening therethrough and wherein the sleeve extends through the opening in one of the wheels and into the opening in the other one of the wheels.

3. Tire retreading or recapping apparatus according to claim 1 wherein each of the wheels has an axial opening therethrough and wherein the means for forcing the wheels apart and for forcing the wheels together includes a fluid operated cylinder, means for removably attaching the cylinder to one of the wheels in axial alignment with the opening therethrough, a piston rod which is hollow to define the sleeve movable within the cylinder and extending through the opening in the wheel to which the cylinder is attached, and means for removably attaching the piston rod to the other one of the wheels.

4. Tire retreading or recapping apparatus according to claim 3 wherein the piston rod is provided with a circumferential groove in its end remote from the cylinder and wherein the means for removably attaching the piston rod to the wheel includes a slidable lock on said wheel that communicates with the opening therethrough and that is adapted to catch in the circumferential groove in the piston rod.

5. Tire retreading or recapping apparatus according to claim 4 wherein the lock is slidable in a radial path, has a plurality of holes spaced in the direction of the path, and is held on the wheel by means of a cap secured to the wheel, a detent dimple in the cap cooperating with a selected one of the holes to retain the lock in a selected position.

6. Tire retreading or recapping apparatus according to claim 5 wherein the cap has a plurality of circularly spaced detent dimples, a selected one of which cooperates with said selected one of the holes in the lock, the remaining detent dimples being held in reserve for use when said selected one of the detent dimples wears down.

References Cited in the file of this patent

UNITED STATES PATENTS

| | | |
|---|---|---|
| 2,475,579 | Napier | July 5, 1949 |
| 2,672,651 | Smyser | Mar. 23, 1954 |
| 2,723,425 | Mattox et al. | Nov. 15, 1955 |